United States Patent [19]

Inoue et al.

[11] Patent Number: 4,652,410

[45] Date of Patent: Mar. 24, 1987

[54] METHOD OF EXCHANGING A DIE HOLDER

[75] Inventors: Seizaburo Inoue, Nashville; Norvel L. Smith, Smyrna, both of Tenn.

[73] Assignees: Bridgestone Corporation; Bridgestone Tire Manufacturing (U.S.A.), Inc.

[21] Appl. No.: 763,598

[22] Filed: Aug. 8, 1985

[51] Int. Cl.⁴ .............................................. B29C 47/08
[52] U.S. Cl. ..................................... 264/39; 264/141; 264/169; 264/176.1; 425/186; 425/190; 425/192 R
[58] Field of Search ................... 264/141, 176 R, 169, 264/39; 425/192 R, 190, 186, 182, 232

[56] References Cited

U.S. PATENT DOCUMENTS

| | | | |
|---|---|---|---|
| 2,444,831 | 7/1948 | Kilborn | 425/192 R |
| 2,488,830 | 11/1949 | Redington | 425/186 |
| 2,807,833 | 10/1957 | Schanz | 425/192 R |
| 2,897,543 | 8/1959 | Weston et al. | 425/190 |
| 3,216,080 | 11/1965 | Norton | 425/192 R |
| 3,486,195 | 12/1969 | Greenwood et al. | 425/192 R |
| 4,316,710 | 2/1982 | Greenwood | 425/186 |
| 4,358,261 | 11/1982 | Ohki | 425/131.1 |

FOREIGN PATENT DOCUMENTS

| | | | |
|---|---|---|---|
| 57-187222 | 11/1982 | Japan | 425/186 |
| 57-210839 | 12/1982 | Japan | 425/190 |

Primary Examiner—Jeffery Thurlow
Attorney, Agent, or Firm—Sughrue, Mion, Zinn, Macpeak, and Seas

[57] ABSTRACT

A method of exchanging a preheated die holder in a die head portion with an existing die holder by moving the preheated die holder into alignment with a recess formed by clamp members and inserting the preheated die holder horizontally. The previously used die holder can be ejected vertically onto a car used to transport the preheated die holder.

4 Claims, 8 Drawing Figures

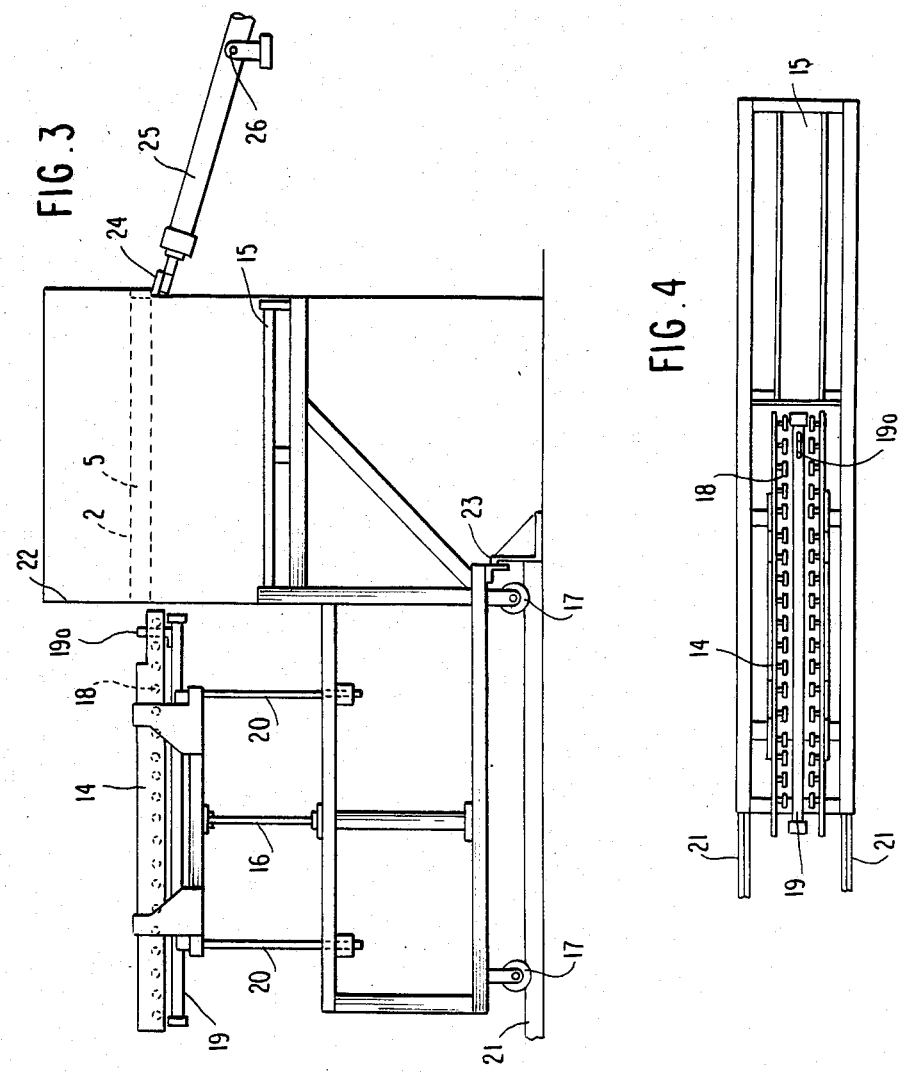
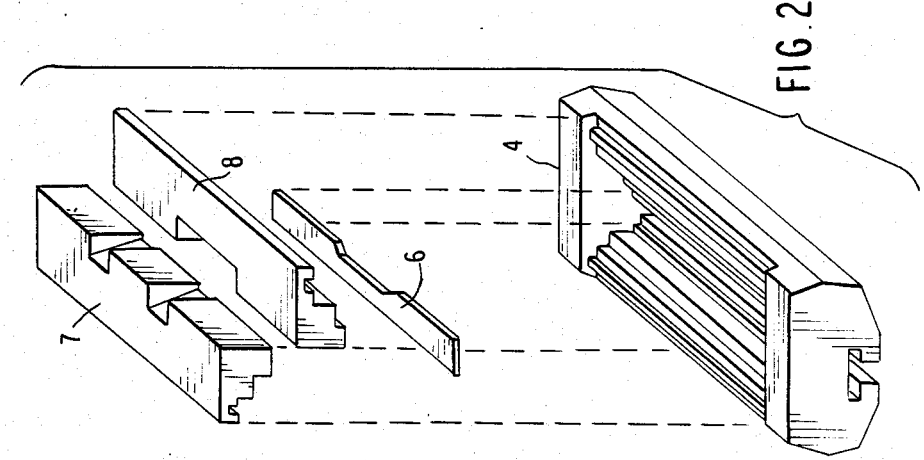

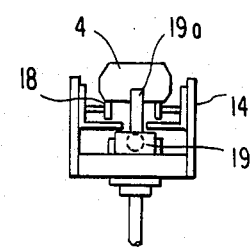
FIG. 5(A)
FIG. 5(B)
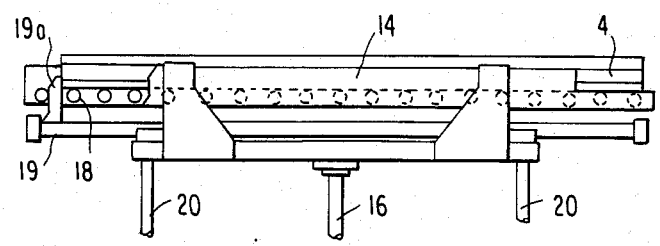
FIG. 6
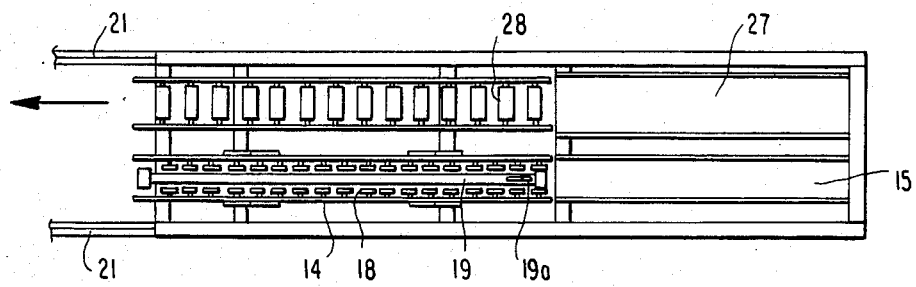

4,652,410

METHOD OF EXCHANGING A DIE HOLDER

FIELD OF THE INVENTION

This invention relates to a method of exchanging a die holder of an extruder having a clamp and a recess on the die head portion thereof to hold the die holder in an operative process of extrusion. The extrusion process forms, rods, tubes, strips, channel and gaskets of a wide variety of sizes and shapes from elastomer compounds.

BACKGROUND OF THE INVENTION

Extrusion is a known economical and widely used method of processing an elastomer for forming unvulcanized rubber coumponds.

An extruder generally comprises a cylindrical piece or barrel in which a screw is rotating. An elastomer strip introduced into the extruder is seized by the screw whose threads advance it toward the end of the cylinder, which has a die of the disired shape. Unvulcanized rubber compounds, heated by processing and ejected under pressure, have the desired continuous shapes. One example is a tire tread, which leaves the extruder flat, is then cut up to proper lengths, and assembled on the drum of the tire building macahine which other "green" tire components. A great variety of rubber components can be made by extrusion using the same essential components. The same basic system is used but the die is changed to alter the configuration of the extruded product. Accordingly, the prompt exchange of a die holder is very important for improvement of productivity of rubber goods.

As shown in FIGS. 1 and 18, an extruder having a movable clamp 1 and a recess 2 on the die head portion 3 hereof will retain a die holder 4. However, it takes a significant amount of time to move a die holder 4 from the point of insertion into an operative location, denoted as element 5 between the recess 2 and the clamp 1. This is because removing an existing die holder and setting a new preheated die holder is conventionally done from the same direction. It is not only difficult but is also dangerous to exchange a die holder using a jig crane as is conventional. The remaining structure of the extruder will be explained herein. Reference is also made to U.S. Pat. No. 4,358,261 which describes a multi-extrusion die system with interchangeable die holders.

SUMMARY OF THE INVENTION

An object of the present invention is to improve the productivity of an extrusion porcess by a different technique for the exchange of die holders.

The present invention provides a method of exchanging a die holder of an extruder, for elastomer compounds, which has a clamp and a recess onto the die head portion thereof so as to hold that die holder, which comprises placing the heated die holder on a table of a flat car capable of longitudinal movement. The table is capable of vertical movement. The heated die holder is placed and aligned in the same direction as a blank space between the recess and the clamp placed in an intermediate position. The heated die holder is transferred to the blank space in the longitudinal direction, followed by fixing the heated die holder into the clamp. This technique allows for a safe and rapid exchange of die holders.

BRIEF DESCRIPTION OF THE DRAWINGS

FIG. 2 is a perspective view of a die holder showing the constitution of essential elements;

FIG. 3 is a side elevational view of a flat car;

FIG. 4 is a top plan view of a flat car;

FIGS. 5A and 5B are a top plan view of another embodiment of the die holder transfer mechanism, and;

FIG 6 is a top plan view of the embodiment of FIG. 5.

DESCRIPTION OF THE PREFERRED EMBODIMENT

The method of the present invention will now be described in further detail with reference to the drawings.

Figure 1A:
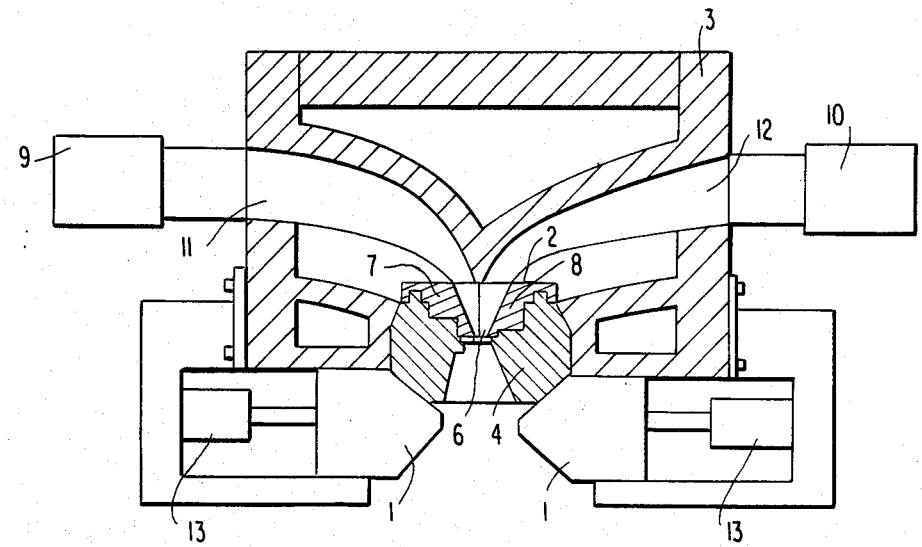
FIG. 1(A) is a cross-sectional view of a die head portion of an extruder having a clamp and a recess, illustrating filing a die holder.
Figure 1B:
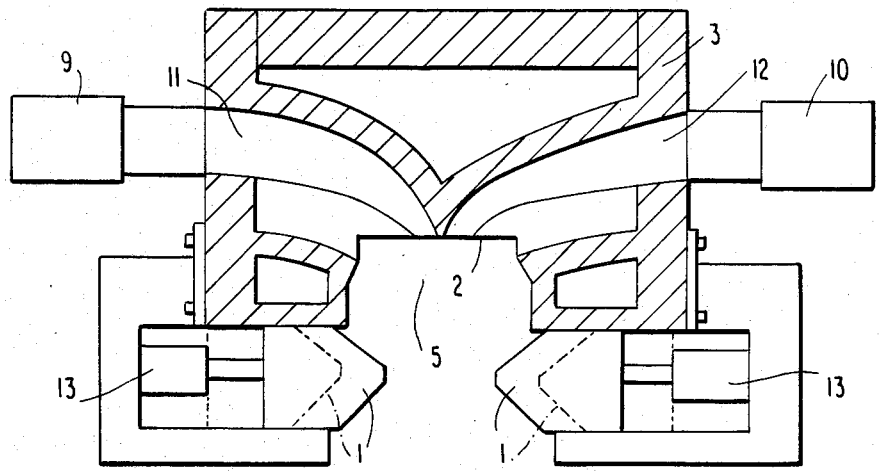
FIG. 1(B) is a cross-sectional view of a die head portion illustrating the intermediate and the released positions of the clamp.

Referring again to FIGS. 1(A), 1(B) and 2 the die head portion of an extruder having a clamp 1 and a recess 2 are depicted. A die holder 4 is equipped with a die 6, a profile insert 7 and a back insert 8. Rubber compounds are extruded from cylinders of the extruders 9, 10 through introducing passages 11, 12. The clamp 1 for holding the die holder is advanced and retracted by a driving device 13 such as hydraulic cylinders. The closed position of the clamp is illustrated in FIG. 1(A). FIG. 1(B) shows the intermediate position of the clamp 1 as a solid line and the released position of the clamp 1 as a dotted line. FIG. 2 illustrates how the die holder 4 is configured with the die 6, the profile insert 7 and the back insert 8.

A movable flat car for exchanging a die holder, as shown in FIGS. 3 and 4, includes a table 14 for holding and transferring a preheated die holder to the blank space 5 in the longitudinal direction. The car inclides a platform 15 for receiving a die holder that has been removed and a drive 16 for moving the table 14 up and down in order to place the preheated die holder in the same straight line as the blank space 5 between the recess 2 and the clamp 1. The preheated die holder is aligned with the parallel tracks 21 on which wheels 17 ride. The table 14 has a number of guide rollers 18 and a horizontal drive 19 having a pusher 19a for transferring the preheated die holder to the blank space 5. The drive 19 must be an air pressure cylinder or an hydraulic cylinder and is supported by not only the vertical drive 16, but also rods 20 moving up and down. The rods eliminate twisting or swaying. An air pressure cylinder or a hydraulic cylinder may also be used as the driving source for drive 16.

A belt 15 is used for receiving a die holder. A textile is used, preferably cotton, to avoid impact.

An extruder is connected to an oven for preheating the die holder via tracks 21. The flat car can then move on the tracks and stop just in front of the die head portion (22). The extruder has a stopper 23 to limit movement and define a positive position for transfer.

The preheated die holder is removed from the oven and placed on the table 14 of the flat car. The flat car is then moved along the tracks to the stop 23. Then, the preheated die holder is lifted with the drive 16 and placed in alignment with the blank space 5. During this transfer, the clamp 1 is positioned in the intermdeiate location (solid line, FIG. 1(B)) to support the die holder. Once in place the tapered surfaces move the die holder upward and lock as the clamp closes.

A die holder previously used is unfastened by releasing the clamp 1 and extruding a small amount of a rubber compound and then the rubber compound is cut with a cutter knife 24. The used die holder is received on the platform 15.

Then, the preheated die holder is transferred horizontally into the blank space 5 by drive 19 advancing the pusher 19a. The preheated die holder is then fixed with the clamp 1.

It is preferred that the cutter knife 24 be driven by a driving means 25 such as an air pressure cylinder or hydraulic cylinder. The driving means is supported by a pivot 26 to acheive proper positioning.

As shown in FIGS. 5 and 6, an alternative embodiment employs a steel plate 27 and multiple rollers 28 on the car.

After being received on the platform 15, the used die holder used is transferred to the steel plate 27. The steel plate 27 is useful to remove rubber compound from the used die holder.

After cleaning of the used die holder, it is transferred in the direction of the arrow in FIG. 6 on the rollers 28 to the oven for preheating and further use. Thus, in this embodiment the car serves dual functions; it transports a new die holder and provides for off-loading the used one. This eliminates a transfer step in the recycling of the die holder.

As mentioned above, according to the method of the invention, exchanging a die holder is carried out consecutively and in a horizontal transfer mode. Since exchanging time is saved, the productivity of extrusion is improved.

What is claimed:

1. A method of exchanging a preheated die holder of an extruder for elastomers, said extruder having a clamp and a recess on a die head portion to hold a die holder, comprising the steps of:

unclamping a die holder installed in said die head portion by releasing said clamp and downwardly extruding a small amount of elastomer;

cutting the elastomer with a cutter knife, and receiving the die holder thus released, placing a preheated die holder on a table of a movable car, said table being capable of vertical movement, aligning said preheated die holder with a blank space between said recess and said clamp when said clamp is placed in an intermediate position, transferring said preheated die holder into said blank space by movement in a longitudial direction, and fixing said preheated die holder with said clamp.

2. The method of claim 1 further comprising the steps moving said car from a first position receiving a preheated die holder to a second position adjacent said die head portion and, following fixing said preheated die holder, moving said car in a reciprocal direction to transfer said unclamped die holder for processing.

3. The method of claim 1 wherein said step of aligning comprising vertically moving said table to align said preheated die holder with said recess.

4. The method of claim 1 wherein said step of transferring comprising moving said die holder off of said table by actuation of a horizontal drive.

* * * * *